(12) United States Patent
Choi

(10) Patent No.: US 7,854,677 B2
(45) Date of Patent: Dec. 21, 2010

(54) POWER TRAIN OF AUTOMATIC TRANSMISSION

(75) Inventor: Hyun Seok Choi, Yongin (KR)

(73) Assignee: Hyundai Motor Company, Seoul (KR)

(*) Notice: Subject to any disclaimer, the term of this patent is extended or adjusted under 35 U.S.C. 154(b) by 473 days.

(21) Appl. No.: 11/868,628

(22) Filed: Oct. 8, 2007

(65) Prior Publication Data

US 2008/0312027 A1 Dec. 18, 2008

(30) Foreign Application Priority Data

Jun. 12, 2007 (KR) .................. 10-2007-0057338

(51) Int. Cl.
*F16H 3/62* (2006.01)
(52) U.S. Cl. .................................................. 475/275
(58) Field of Classification Search ......... 475/275–278, 475/284
See application file for complete search history.

(56) References Cited

U.S. PATENT DOCUMENTS

| | | | | |
|---|---|---|---|---|
| 5,749,805 A | * | 5/1998 | Shimada et al. | 477/116 |
| 6,860,831 B2 | * | 3/2005 | Ziemer | 475/296 |
| 6,910,985 B2 | * | 6/2005 | Ishimaru et al. | 475/275 |
| 7,524,257 B2 | * | 4/2009 | Tabata et al. | 475/285 |
| 7,604,558 B2 | * | 10/2009 | Okada et al. | 475/159 |
| 7,604,563 B2 | * | 10/2009 | Phillips | 475/280 |
| 7,632,201 B2 | * | 12/2009 | Takami et al. | 475/5 |
| 2003/0083174 A1 | * | 5/2003 | Tabata et al. | 475/323 |

* cited by examiner

*Primary Examiner*—Ha D. Ho
(74) *Attorney, Agent, or Firm*—Morgan, Lewis & Bockius LLP

(57) ABSTRACT

A power train of an automatic transmission that realizes eight forward speeds and two reverse speeds by using two or three planetary gear sets, five clutches, and one brake, wherein a speed reduction unit generates a reduced rotational speed and an output unit receives a rotational speed of an input shaft and the reduced rotational speed and generates the eight forward speeds and the two reverse speeds.

4 Claims, 11 Drawing Sheets

FIG.2

| shift speed | C1 | C2 | C3 | C4 | C5 | B1 |
|---|---|---|---|---|---|---|
| D1 | ○ | | | | | ○ |
| D2 | ○ | | | | ○ | |
| D3 | ○ | ○ | | | | |
| D4 | ○ | | ○ | | | |
| D5 | ○ | | | ○ | | |
| D6 | | | ○ | ○ | | |
| D7 | | ○ | | ○ | | |
| D8 | | | | ○ | ○ | |
| REV.1 | | ○ | | | | ○ |
| REV.2 | | | ○ | | | ○ |

POWER TRAIN OF AUTOMATIC TRANSMISSION

CROSS-REFERENCE TO RELATED APPLICATION

This application claims priority to and the benefit of Korean Patent Application No. 10-2007-0057338 filed in the Korean Intellectual Property Office on Jun. 12, 2007, the entire contents of which are incorporated herein by reference.

BACKGROUND OF THE INVENTION (a) Field of the Invention

The present invention relates to a power train of an automatic transmission. More particularly, the present invention relates to a power train of an automatic transmission that realizes eight forward speeds and two reverse speeds.

(b) Description of the Related Art

A typical shift mechanism of an automatic transmission utilizes a combination of a plurality of planetary gear sets. A power train of such an automatic transmission that includes the plurality of planetary gear sets changes rotational speed and torque received from a torque converter of the automatic transmission, and accordingly transmits the changed torque to an output shaft.

It is well known that when a transmission realizes a greater number of shift speeds, speed ratios of the transmission can be more optimally designed, and therefore a vehicle can have economic fuel mileage and better performance. For that reason, an automatic transmission that is able to realize more shift speeds is under continuous investigation.

In addition, with the same number of speeds, features of a power train, such as durability, efficiency in power transmission, and size, depend a lot on the layout of the combined planetary gear sets. Therefore, designs for a combining structure of a power train are also under continuous investigation.

A manual transmission that has too many speeds causes inconvenience to a driver. Therefore, the advantageous features of having more shift-speeds are more important in an automatic transmission because an automatic transmission automatically controls the shifting operations.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a power train of an automatic transmission having advantages of improving power delivery performance and reducing fuel consumption as a consequence of realizing eight forward speeds and two reverse speeds by using two or three planetary gear sets, five clutches, and one brake.

A power train of an automatic transmission according to exemplary embodiments of the present invention may include an input shaft, an output gear, a transmission case, a speed reduction unit, an output unit, and a plurality of friction members. The speed reduction unit may include a first operating member receiving torque from the input shaft, a second operating member fixed to the transmission case, and a third operating member generating a reduced rotational speed by operations of the first and second operating members. The output unit may include a fourth operating member selectively connected to the second operating member and stopped or selectively connected to the input shaft or selectively connected to the third operating member and receiving the reduced rotational speed, a fifth operating member selectively connected to the third operating member and receiving the reduced rotational speed, a sixth operating member selectively connected to the input shaft or selectively connected to the transmission case and stopped, and a seventh operating member transmitting eight forward speeds and two reverse speeds to the output gear by operations of the fourth, fifth, and sixth operating members. The plurality of friction members selectively connects the operating members of the speed reduction unit and the output unit to the input shaft, other operating members, or the transmission case.

The plurality of friction members may include: a first clutch selectively connecting the third operating member to the fifth operating member; a second clutch selectively connecting the third operating member to the fourth operating member; a third clutch selectively connecting the fourth operating member to the input shaft; a fourth clutch selectively connecting the sixth operating member to the input shaft; a fifth clutch selectively connecting the second operating member to the fourth operating member; and a first brake selectively connecting the sixth operating member to the transmission case.

The speed reduction unit may be a first planetary gear set having a first sun gear, a first ring gear, and a first planet carrier as operational members thereof.

The first planetary gear set may be a double pinion planetary gear set, wherein the first sun gear is operated as the first operating member, the first planet carrier is operated as the second operating member, and the first ring gear is operated as the third operating member.

According to the first exemplary embodiment of the present invention, the output unit may be a second planetary gear set having a second sun gear, a third sun gear, a second planet carrier, and a second ring gear as operational members thereof, wherein the second planetary gear set is a compound planetary gear set where a double pinion planetary gear set having the second sun gear, the second planet carrier, and the second ring gear and a single pinion planetary gear set having the third sun gear, the second planet carrier, the second ring gear have the second planet carrier and the second ring gear in common.

The third sun gear is operated as the fourth operating member, the second sun gear is operated as the fifth operating member, the second planet carrier is operated as the sixth operating member, and the second ring gear is operated as the seventh operating member.

The first, second, and fifth clutches and the first brake may be disposed between the first planetary gear set and the second planetary gear set.

The third and fourth clutches may be disposed on an opposite side to the first planetary gear set with reference to the second planetary gear set.

According to the second exemplary embodiment of the present invention, the output unit may be a second planetary gear set having a second sun gear, a third sun gear, a second planet carrier, and a second ring gear as operational members thereof, wherein the second planetary gear set is a compound planetary gear set where a single pinion planetary gear set having the second sun gear, the second planet carrier, and the second ring gear and a double pinion planetary gear set having the third sun gear, the second planet carrier, the second ring gear have the second planet carrier and the second ring gear in common.

The third sun gear is operated as the fourth operating member, the second sun gear is operated as the fifth operating member, the second ring gear is operated as the sixth operating member, and the second planet carrier is operated as the seventh operating member.

The first, second, and fifth clutches may be disposed between the first planetary gear set and the second planetary gear set.

The third and fourth clutches may be disposed on an opposite side to the first planetary gear set with reference to the second planetary gear set.

According to the third exemplary embodiment of the present invention, the output unit may include a second planetary gear set having a second sun gear, a second planet carrier, and a second ring gear as operational members thereof and a third planetary gear set having a third sun gear, a third planet carrier, and a third ring gear as operational members thereof, wherein the second planet carrier is fixedly connected to the third ring gear and the third planet carrier is fixedly connected to the second ring gear.

The third sun gear may be operated as the fourth operating member, the second sun gear be operated as the fifth operating member, at least one of the fixedly connected second ring gear and the third planet carrier be operated as the sixth operating member, and at least one of the fixedly connected third ring gear and the second planet carrier be operated as the seventh operating member.

The first, second, and fifth clutches may be disposed between the speed reduction unit and the output unit.

The third and fourth clutches may be disposed on an opposite side to the speed reduction unit with reference to the output unit.

According to the fourth exemplary embodiment of the present invention, the output unit may include a second planetary gear set having a second sun gear, a second planet carrier, and a second ring gear as operational members thereof and a third planetary gear set having a third sun gear, a third planet carrier, and a third ring gear as operational members thereof, wherein the second planet carrier is fixedly connected to the third ring gear and the second sun gear is fixedly connected to the third sun gear.

At least one of the fixedly connected second sun gear and the third sun gear may be operated as the fourth operating member, the second ring gear be operated as the fifth operating member, the third planet carrier be operated as the sixth operating member, and at least one of the fixedly connected second planet carrier and the third ring gear be operated as the seventh operating member.

The first, second, and fifth clutches may be disposed between the speed reduction unit and the output unit.

The third and fourth clutches and the first brake may be disposed on an opposite side to the speed reduction unit with reference to the output unit.

According to the fifth exemplary embodiment of the present invention, the output unit may be a second planetary gear set having a second sun gear, a second planet carrier, a second ring gear, and a third ring gear as operational members thereof, wherein the second planetary gear set is a Ravigneaux planetary gear set where a single pinion planetary gear set having the second sun gear, the second planet carrier, and the second ring gear and a double pinion planetary gear set having the second sun gear, the second planet carrier, and the third ring gear have the second sun gear and the second planet carrier in common.

The second sun gear is operated as the fourth operating member, the second ring gear is operated as the fifth operating member, the third ring gear is operated as the sixth operating member, and the second planet carrier is operated as the seventh operating member.

The first, second, and fifth clutches may be disposed between the first planetary gear set and the second planetary gear set.

The third and fourth clutches may be disposed on an opposite side to the first planetary gear set with reference to the second planetary gear set.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 2 is an operational chart for power trains of an automatic transmission according to exemplary embodiments of the present invention;

Figure 1:
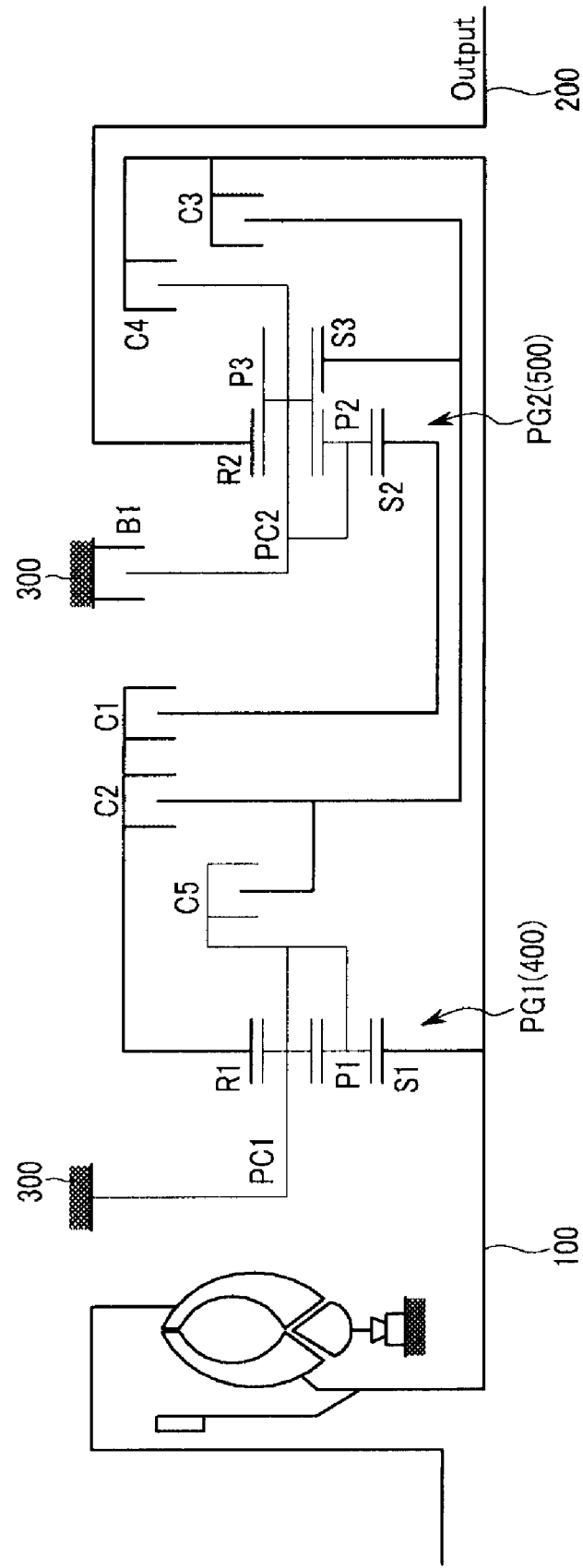
FIG. 1 is a schematic diagram of a power train of an automatic transmission according to the first exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE EMBODIMENTS

In the figures, reference numbers refer to the same or equivalent parts of the present invention throughout the several figures of the drawing.

Exemplary embodiments of the present invention will hereinafter be described in detail with reference to the accompanying drawings.

As shown in FIG. 1 to FIG. 11, power trains of an automatic transmission according to exemplary embodiments of the present invention include an input shaft 100, an output gear 200, a transmission case 300, a speed reduction unit 400, an output unit 500, and a plurality of friction members C1, C2, C3, C4, C5, and B1.

The input shaft 100 receives torque from an engine (not shown).

The output gear 200 transmits torque from the power train.

The speed reduction unit 400 includes first, second, and third operating members, receives torque from the input shaft 100, and transmits a reduced rotational speed to the output unit 500 by operations of the first, second, and third operating members. The first operating member is fixedly connected to the input shaft 100 and always rotates with the same rotational speed as the input shaft 100. The second operating member is fixed to the transmission case 300 and is always stopped. The third operating member generates the reduced rotational speed by operations of the first and second operating members.

The output unit 500 includes fourth, fifth, sixth, and seventh operating members, receives the reduced rotational speed from the speed reduction unit 400 or receives the rotational speed of the input shaft 100, and transmits eight forward speeds and two reverse speeds to the output gear 200. The fourth operating member is selectively connected to the second operating member and is stopped, is selectively connected to the third operating member and receives the reduced rotational speed, or is selectively connected to the input shaft. The fifth operating member is selectively connected to the third operating member and receives the reduced rotational speed. The sixth operating member is selectively connected to the input shaft 100 or the transmission case 300. The seventh operating member is fixedly connected to the output gear 200 and transmits eight forward speeds and two reverse speeds generated by operations of the fourth, fifth, and sixth operating members to the output gear 200.

The plurality of friction members connects operating members of the speed reduction unit 400 and the output unit 500 to the input shaft 100, other operating members, or the transmission case 300. The plurality of friction members includes the first, second, third, fourth, and fifth clutches C1, C2, C3, C4, and C5 and the first brake B1. The first clutch C1 selectively connects the third operating member to the fifth operating member and selectively transmits the reduced rotational speed of the third operating member to the fifth operating member. The second clutch C2 selectively connects the third operating member to the fourth operating member and selectively transmits the reduced rotational speed of the third operating member to the fourth operating member. The third clutch C3 selectively connects the fourth operating member to the input shaft 100 and selectively transmits the rotational speed of the input shaft 100 to the fourth operating member. The fourth clutch C4 selectively connects the sixth operating member to the input shaft 100 and selectively transmits the rotational speed of the input shaft 100 to the sixth operating member. The fifth clutch C5 selectively connects the second operating member to the fourth operating member. Since the second operating member is fixed to the transmission case 300, when the fifth clutch C5 is connected the fourth operating member is also stopped. The first brake B1 selectively connects the sixth operating member to the transmission case 300 and thus selectively stops the sixth operating member.

Hereinafter, referring to FIG. 1, the power train of an automatic transmission according to the first exemplary embodiment of the present invention will be described in detail.

As shown in FIG. 1, according to the first exemplary embodiment of the present invention, the speed reduction unit 400 includes a first planetary gear set PG1 and the output unit 500 includes a second planetary gear set PG2.

The first planetary gear set PG1 is a double pinion planetary gear set, and has a first sun gear S1, a first planet carrier PC1, and a first ring gear R1 as operational members thereof. A first pinion gear P1, engaged with the first ring gear R1 and the first sun gear S1, is connected to the first planet carrier PC1. In addition, the first sun gear S1 is operated as the first operating member, the first planet carrier PC1 is operated as the second operating member and the first ring gear R1 is operated as the third operating member.

The second planetary gear set PG2 is a compound planetary gear set, and has a second sun gear S2, a third sun gear S3, a second planet carrier PC2, and a second ring gear R2 as operational members thereof. A second pinion gear P2, engaged with the second sun gear S2 and the second ring gear R2, and a third pinion gear P3, engaged with the third sun gear S3 and the second ring gear R2, are connected to the second planet carrier PC2. More concretely, the second planetary gear set PG2 is the compound planetary gear set where the double pinion planetary gear set having the second sun gear S2, the second pinion gear P2, the third pinion gear P3, the second planet carrier PC2, and the second ring gear R2 and the single pinion planetary gear set having the third sun gear S3, the third pinion gear P3, the second planet carrier PC2, and the second ring gear R2 have the second planet carrier PC2 and the second ring gear R2 in common. In addition, the third sun gear S3 is operated as the fourth operating member, the second sun gear S2 is operated as the fifth operating member, the second planet carrier PC2 is operated as the sixth operating member, and the second ring gear R2 is operated as the seventh operating member.

In addition, the first, second, and fifth clutches C1, C2, and C5 and the first brake B1 are disposed between the first planetary gear set PG1 and the second planetary gear set PG2, and the third and fourth clutches C3 and C4 are disposed on an opposite side to the first planetary gear set PG1 with reference to the second planetary gear set PG2.

In addition, the first and second planetary gear sets PG1 and PG2 are disposed in a sequence of the first planetary gear set PG1 and the second planetary gear set PG2.

Hereinafter, referring to FIG. 2, operations of the power train of an automatic transmission according to the first exemplary embodiment of the present invention will be described.

As shown in FIG. 2, according to the first exemplary embodiment of the present invention, the first clutch C1 and the first brake B1 are applied in a first forward speed, the first and fifth clutches C1 and C5 are applied in a second forward speed, the first and second clutches C1 and C2 are applied in a third forward speed, the first and third clutches C1 and C3 are applied in a fourth forward speed, the first and fourth clutches C1 and C4 are applied in a fifth forward speed, the third and fourth clutches C3 and C4 are applied in a sixth forward speed, the second and fourth clutches C2 and C4 are applied in a seventh forward speed, and the fourth and fifth clutches C4 and C5 are applied in an eighth forward speed.

In addition, the second clutch C2 and the first brake B1 are applied in a first reverse speed REV. 1, and the third clutch C3 and the first brake B1 are applied in a second reverse speed REV. 2.

Hereinafter, formation of the eight forward speeds and two reverse speeds in the power train of an automatic transmission according to the first exemplary embodiment of the present invention will be described in detail.

Figure 3:
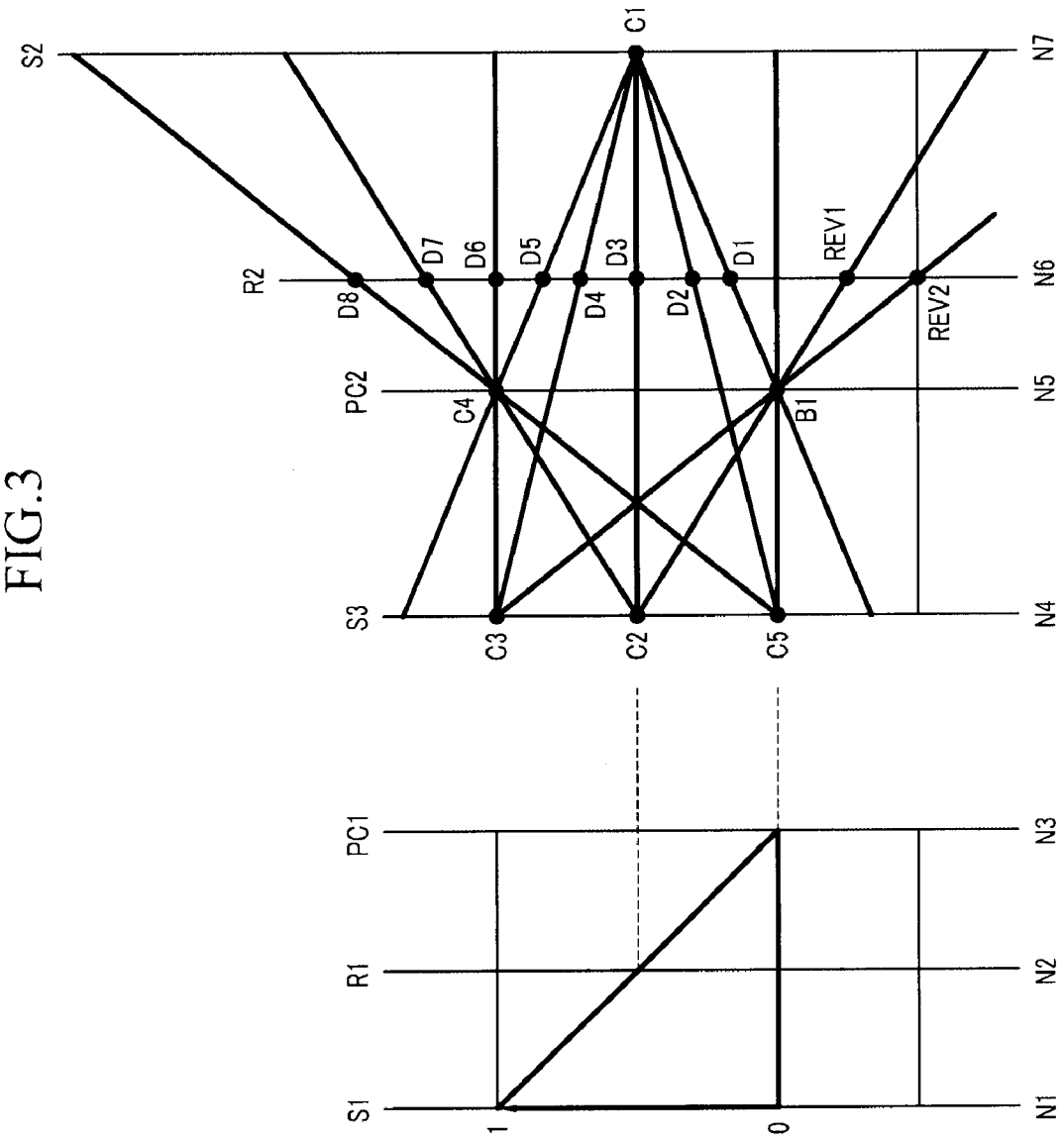
FIG. 3 is a lever diagram showing shifting processes from a first forward speed to an eighth forward speed and two reverse speeds in a power train of an automatic transmission according to the first exemplary embodiment of the present invention.

As shown in FIG. 3, the power train of an automatic transmission according to the first exemplary embodiment of the present invention includes one double pinion planetary gear set PG1 and one compound planetary gear set PG2. Therefore, operational members of the power train according to the first exemplary embodiment of the present invention are represented as seven nodes (N1, N2, N3, N4, N5, N6 and N7) in the lever diagram.

Accordingly, the first sun gear S1 is set as a first node N1, the first ring gear R1 is set as a second node N2, the first planet carrier PC1 is set as a third node N3, the third sun gear S3 is set as a fourth node N4, the second planet carrier PC2 is set as a fifth node N5, the second ring gear R2 is set as a sixth node N6, and the second sun gear S2 is set as a seventh node N7.

As described above, the first sun gear S1 is fixed to the input shaft 100, and thus the first node N1 rotates with the same rotational speed as the input shaft 100. In addition, the first planet carrier PC1 is fixed to the transmission case 300, and thus the third node N3 is always stopped. Therefore, the second node N2 of the first ring gear R1 rotates with the reduced rotational speed.

The third sun gear S3 is selectively connected to the input shaft 100 by the third clutch C3, is selectively connected to the first planet carrier PC1 by the fifth clutch C5, and is selectively connected to the first ring gear R1 by the second clutch C2. Accordingly, the fourth node N4 of the third sun gear S3 rotates with the same rotational speed as the input shaft 100 by operation of the third clutch C3, is stopped by operation of the fifth clutch C5, or rotates with the reduced rotational speed by operation of the second clutch C2.

The second planet carrier PC2 is selectively connected to the input shaft 100 by the fourth clutch C4, and thus the fifth node N5 of the second planet carrier PC2 rotates with the same rotational speed as the input shaft 100 by operation of the fourth clutch C4. In addition, the second planet carrier PC2 is selectively connected to the transmission case 300 by the first brake B1, and thus the fifth node N5 is stopped by operation of the first brake B1.

The sixth node N6 of the second ring gear R2 is fixedly connected to the output gear 200 and operates as an output member.

The second sun gear S2 is selectively connected to the first ring gear R1 by the first clutch C1, and thus the seventh node N7 of the second sun gear S2 receives the reduced rotational speed by operation of the first clutch C1.

Hereinafter, processes for realizing respective shift speeds in the power train of an automatic transmission according to the first exemplary embodiment of the present invention will be described in detail, referring to FIG. 3.

In the first forward speed D1, the seventh node N7 rotates with the reduced rotational speed by the operation of the first clutch C1. In addition, the fifth node N5 is stopped by the operation of the first brake B1. Therefore, the first forward speed D1 is achieved at the sixth node N6.

In the second forward speed D2, the seventh node N7 rotates with the reduced rotational speed by the operation of the first clutch C1. In addition, the fourth node N4 is stopped by the operation of the fifth clutch C5. Therefore, the second forward speed D2 is achieved at the sixth node N6.

In the third forward speed D3, the seventh node N7 rotates with the reduced rotational speed by the operation of the first clutch C1. In addition, the fourth node N4 also rotates with the reduced rotational speed by the operation of the second clutch C2. Therefore, the third forward speed D3 is achieved at the sixth node N6.

In the fourth forward speed D4, the seventh node N7 rotates with the reduced rotational speed by the operation of the first clutch C1. In addition, the fourth node N4 rotates with the same rotational speed as the input shaft 100 by the operation of the third clutch C3. Therefore, the fourth forward speed D4 is achieved at the sixth node N6.

In the fifth forward speed D5, the seventh node N7 rotates with the reduced rotational speed by the operation of the first clutch C1. In addition, the fifth node N5 rotates with the same rotational speed as the input shaft 100 by the operation of the fourth clutch C4. Therefore, the fifth forward speed D5 is achieved at the sixth node N6.

In the sixth forward speed D6, the fourth node N4 rotates with the same rotational speed as the input shaft 100 by the operation of the third clutch C3. In addition, the fifth node N5 rotates with the same rotational speed as the input shaft 100 by the operation of the fourth clutch C4. Therefore, the sixth forward speed D6 is achieved at the sixth node N6.

In the seventh forward speed D7, the fourth node N4 rotates with the reduced rotational speed by the operation of the second clutch C2. In addition, the fifth node N5 rotates with the same rotational speed as the input shaft 100 by the operation of the fourth clutch C4. Therefore, the seventh forward speed D7 is achieved at the sixth node N6.

In the eighth forward speed D8, the fifth node N5 rotates with the same rotational speed as the input shaft 100 by the operation of the fourth clutch C4. In addition, the fourth node N4 is stopped by the operation of the fifth clutch C5. Therefore, the eighth forward speed D8 is achieved at the sixth node N6.

In the first reverse speed REV. 1, the fourth node N4 rotates with the reduced rotational speed by the operation of the second clutch C2. In addition, the fifth node N5 is stopped by the operation of the first brake B1. Therefore, the first reverse speed REV. 1 is achieved at the sixth node N6.

In the second reverse speed REV. 2, the fourth node N4 rotates with the same rotational speed as the input shaft 100 by the operation of the third clutch C3. In addition, the fifth node N5 is stopped by the operation of the first brake B1. Therefore, the second reverse speed REV. 2 is achieved at the sixth node N6.

Hereinafter, the power trains of an automatic transmission according to other exemplary embodiments of the present inventions will be described. The power trains of an automatic transmission according to other exemplary embodiments of the present inventions are similar to the power train of an automatic transmission according to the first exemplary embodiment of the present invention. Therefore, only differences between the first embodiment of the present invention and the other embodiments of the present invention will be described.

Figure 4:
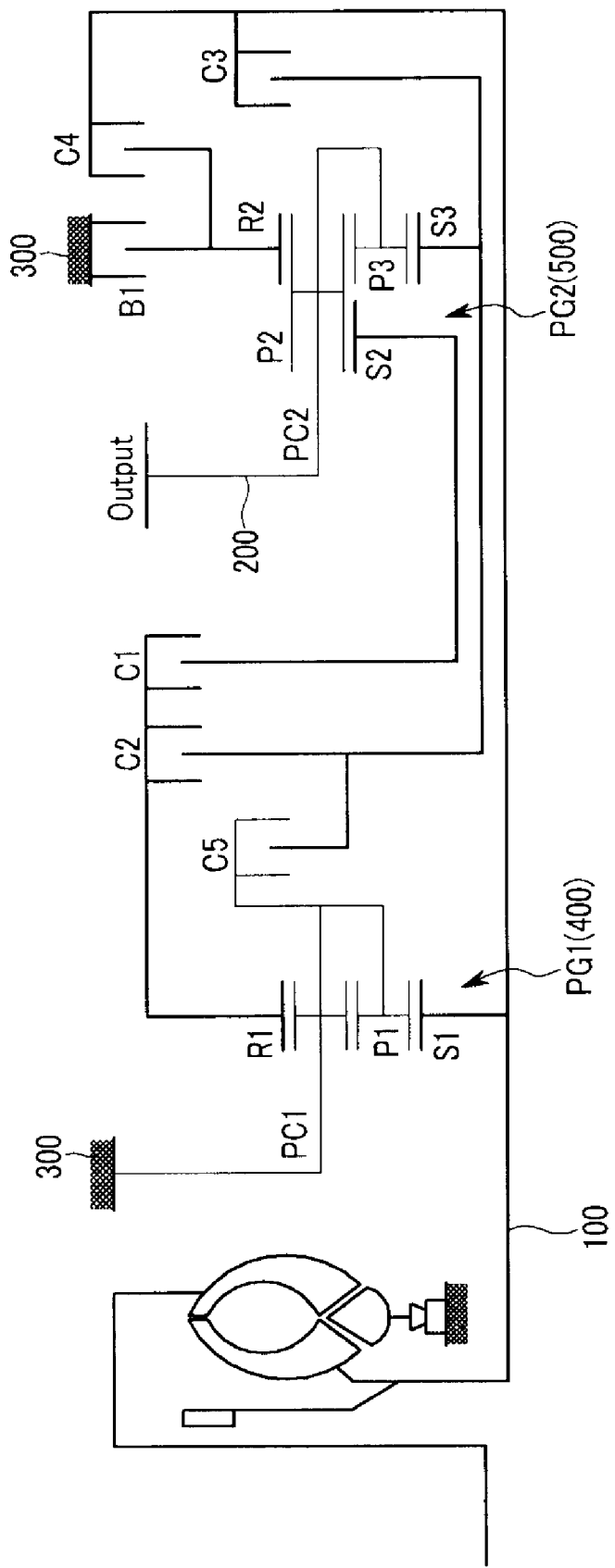
FIG. 4 is a schematic diagram of a power train of an automatic transmission according to the second exemplary embodiment of the present invention.
Figure 5:
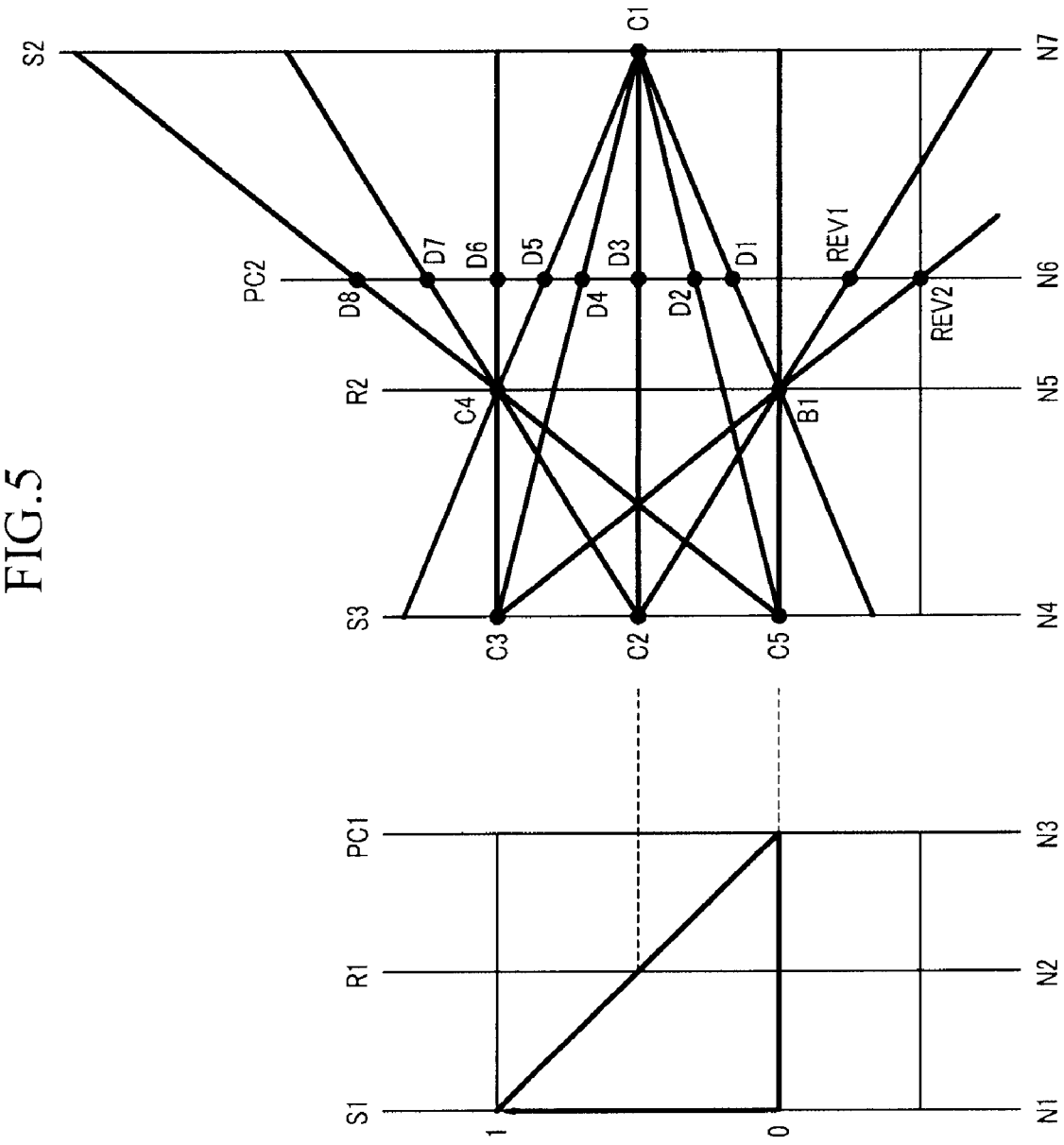
FIG. 5 is a lever diagram showing shifting processes from a first forward speed to an eighth forward speed and two reverse speeds in a power train of an automatic transmission according to the second exemplary embodiment of the present invention.

As shown in FIG. 4, according to the second exemplary embodiment of the present invention, the speed reduction unit 400 includes a first planetary gear set PG1 and the output unit 500 includes a second planetary gear set PG2.

The first planetary gear set PG1 is a double pinion planetary gear set, and has a first sun gear S1, a first planet carrier PC1, and a first ring gear R1 as operational members thereof. In addition, the first sun gear S1 is operated as the first operating member, the first planet carrier PC1 is operated as the second operating member, and the first ring gear R1 is operated as the third operating member.

The second planetary gear set PG2 is a compound planetary gear set, and has a second sun gear S2, a third sun gear S3, a second planet carrier PC2, and a second ring gear R2 as operational members thereof. The second planetary gear set PG2 is the compound planetary gear set where a single pinion planetary gear set having the second sun gear S2, the second planet carrier PC2, and the second ring gear R2 and a double pinion planetary gear set having the third sun gear S3, the second planet carrier PC2, and the second ring gear R2 have the second planet carrier PC2 and the second ring gear R2 in common. In addition, the third sun gear S3 is operated as the fourth operating member, the second sun gear S2 is operated as the fifth operating member, the second ring gear R2 is operated as the sixth operating member, and the second planet carrier PC2 is operated as the seventh operating member.

In addition, the first, second, and fifth clutches C1, C2, and C5 are disposed between the first planetary gear set PG1 and the second planetary gear set PG2, and the third and fourth clutches C3 and C4 are disposed on an opposite side to the first planetary gear set PG1 with reference to the second planetary gear set PG2.

Operation, shifting processes, and formation of each speed of the power train according to the second exemplary embodiment of the present invention are similar to those of the power train according to the first embodiment of the present invention, and may be easily obtained by a person skilled in the art based on the teachings herein. Thus, a detailed explanation thereof will be omitted.

Figure 6:
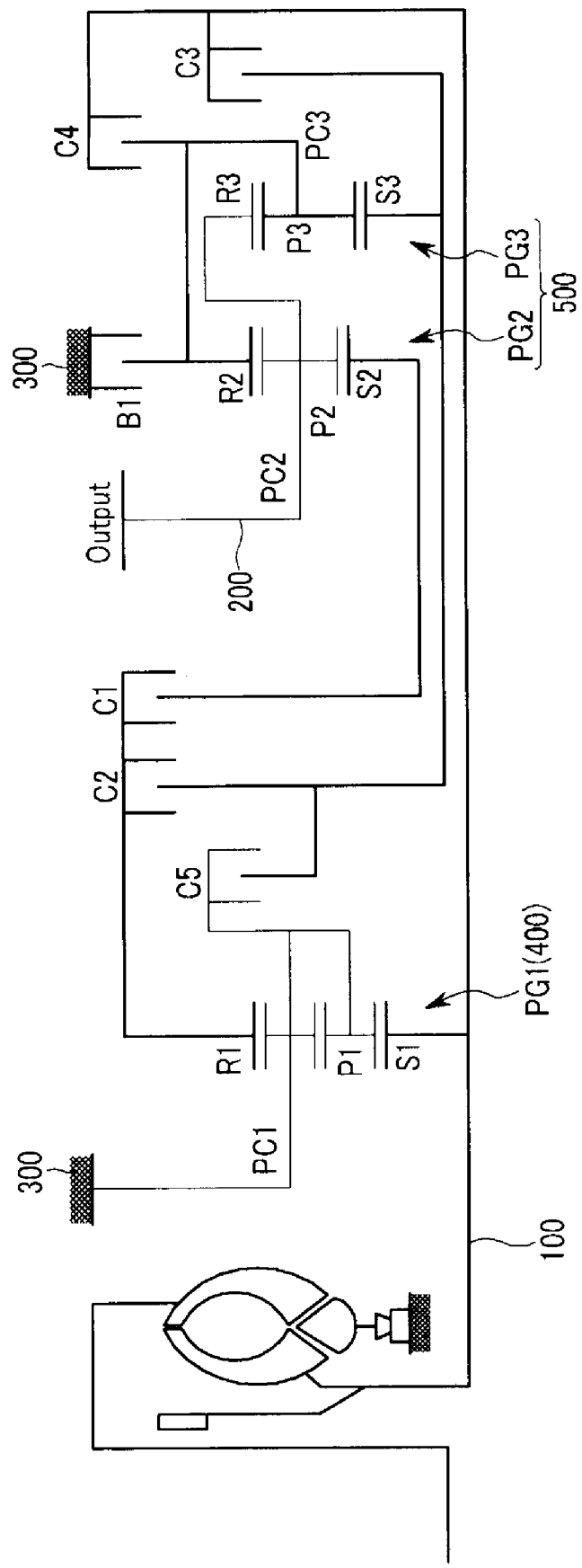
FIG. 6 is a schematic diagram of a power train of an automatic transmission according to the third exemplary embodiment of the present invention.
Figure 7:
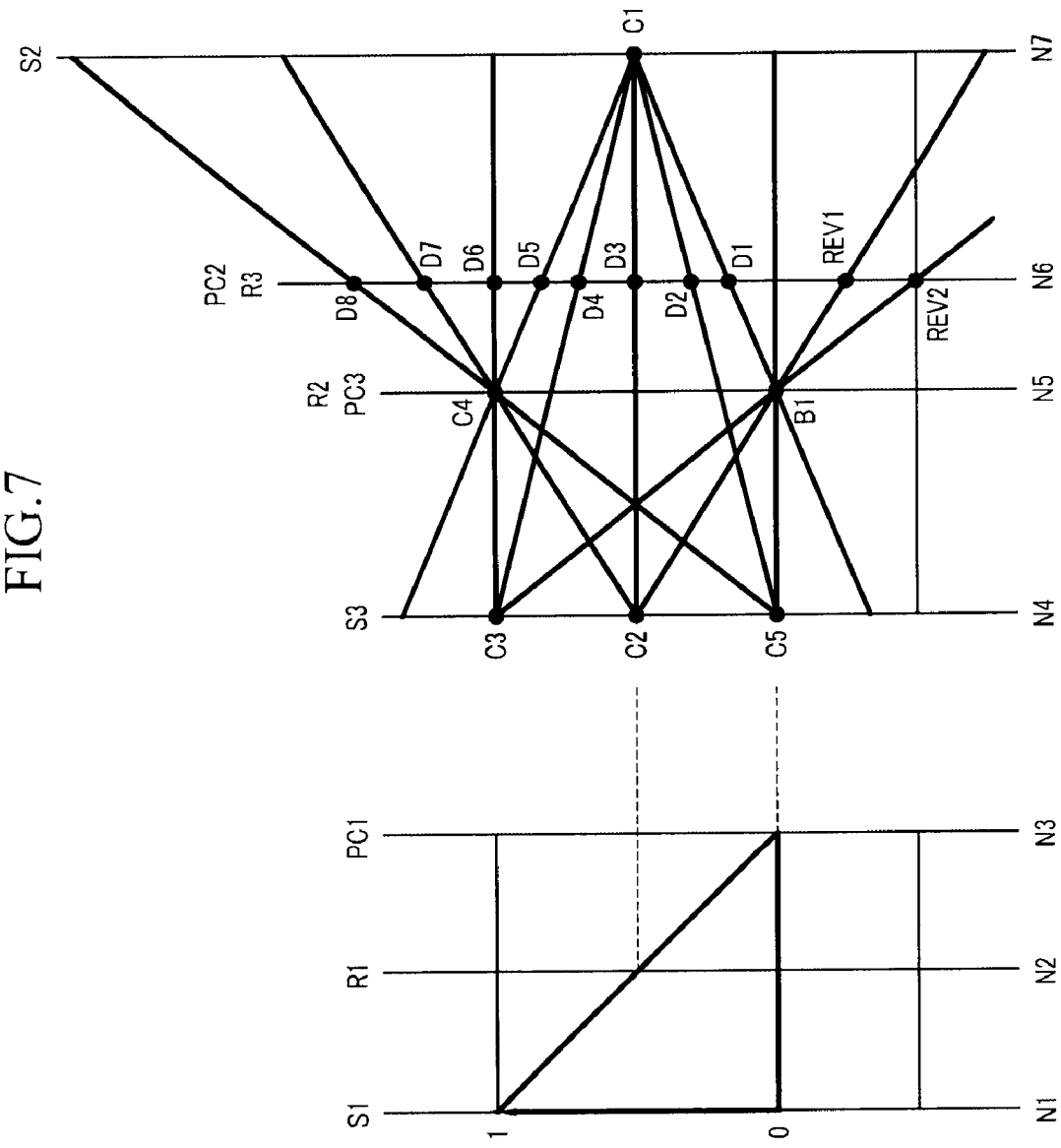
FIG. 7 is a lever diagram showing shifting processes from a first forward speed to an eighth forward speed and two reverse speeds in a power train of an automatic transmission according to the third exemplary embodiment of the present invention.

As shown in FIG. 6, according to the third exemplary embodiment of the present invention, the speed reduction unit 400 includes a first planetary gear set PG1 and the output unit 500 includes second and third planetary gear sets PG2 and PG3.

The first planetary gear set PG1 is a double pinion planetary gear set, and has a first sun gear S1, a first planet carrier PC1, and a first ring gear R1 as operational members thereof. In addition, the first sun gear S1 is operated as the first operating member, the first planet carrier PC1 is operated as the second operating member, and the first ring gear R1 is operated as the third operating member.

The second planetary gear set PG2 is a single pinion planetary gear set, and has a second sun gear S2, a second planet carrier PC2, and a second ring gear R2 as operational members thereof.

The third planetary gear set PG3 is a single pinion planetary gear set, and has a third sun gear S3, a third planet carrier PC3, and a third ring gear R3 as operational members thereof.

The second planet carrier PC2 is fixedly connected to the third ring gear R3, and the third planet carrier PC3 is fixedly connected to the second ring gear R2.

In addition, the third sun gear S3 is operated as the fourth operating member, the second sun gear S2 is operated as the fifth operating member, at least one of the fixedly connected second ring gear R2 and the third planet carrier PC3 is operated as the sixth operating member, and at least one of the fixedly connected third ring gear R3 and the second planet carrier PC2 is operated as the seventh operating member.

In addition, the first, second, and fifth clutches C1, C2, and C5 are disposed between the first planetary gear set PG1 and the second planetary gear set PG2, and the third and fourth clutches C3 and C4 are disposed on an opposite side to the speed reduction unit 400 with reference to the output unit 500.

Operation, shifting processes, and formation of each speed of the power train according to the third exemplary embodiment of the present invention are similar to those of the power train according to the first embodiment of the present invention, and may be easily obtained by a person skilled in the art based on the teachings herein. Thus, a detailed explanation thereof will be omitted.

Figure 8:
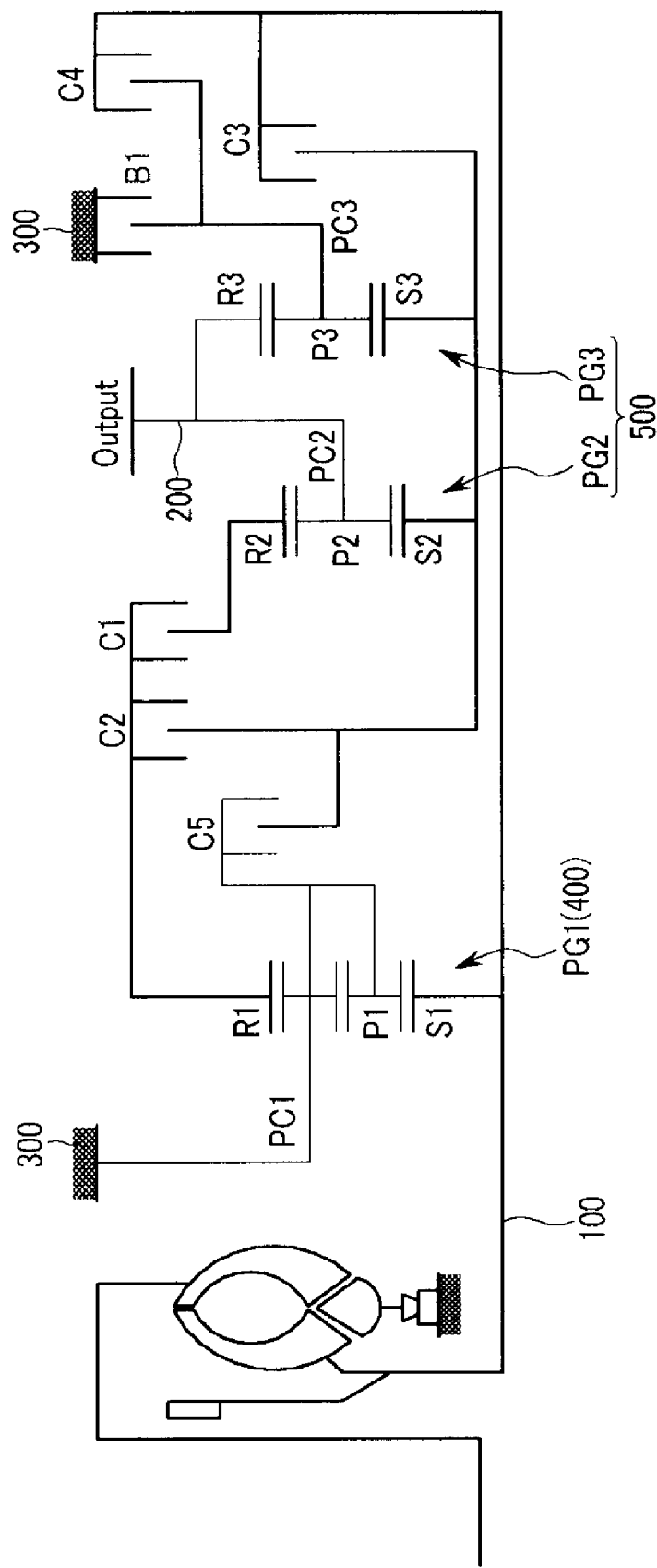
FIG. 8 is a schematic diagram of a power train of an automatic transmission according to the fourth exemplary embodiment of the present invention.
Figure 9:
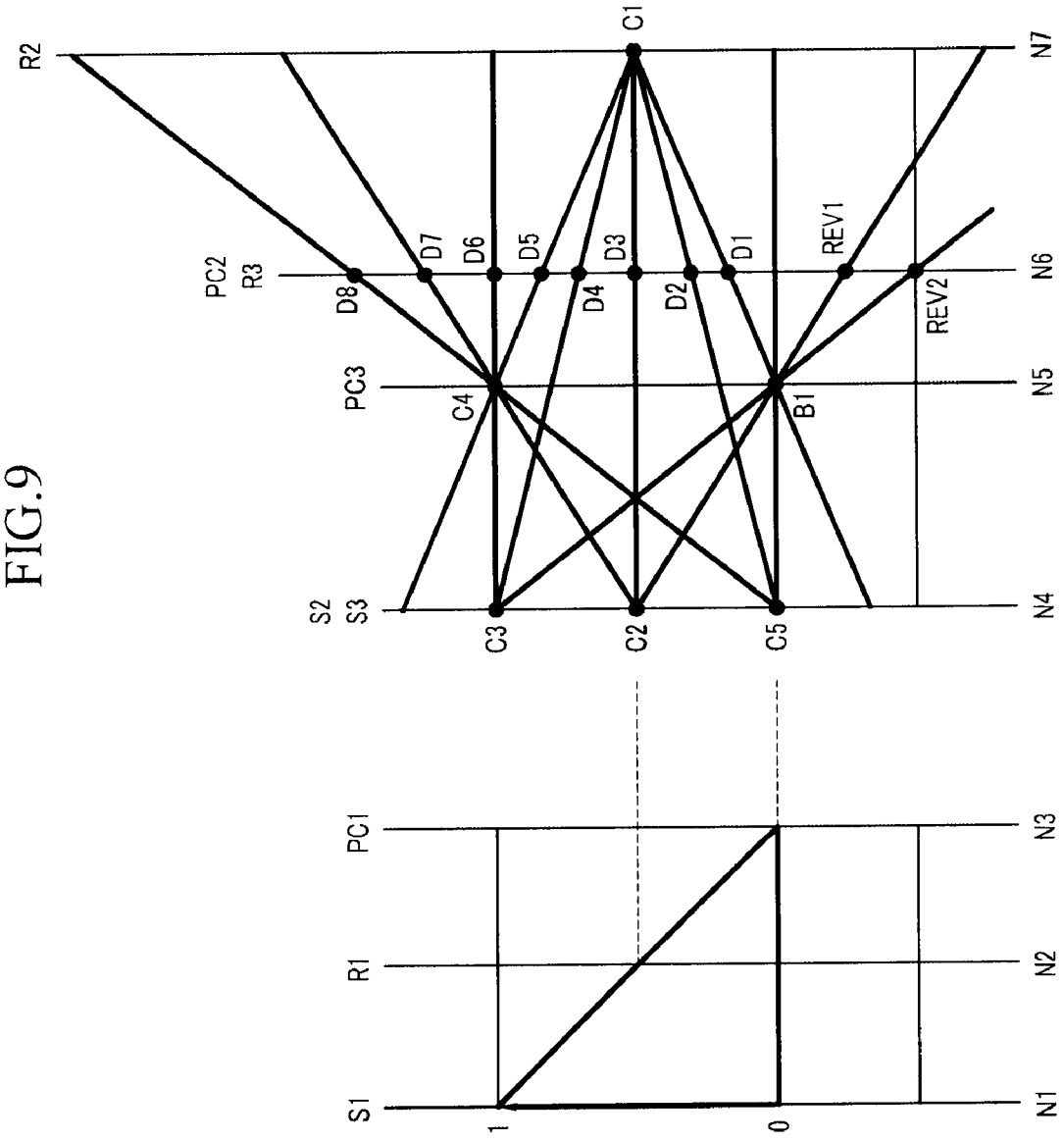
FIG. 9 is a lever diagram showing shifting processes from a first forward speed to an eighth forward speed and two reverse speeds in a power train of an automatic transmission according to the fourth exemplary embodiment of the present invention.

As shown in FIG. 8, according to the fourth exemplary embodiment of the present invention, the speed reduction unit 400 includes a first planetary gear set PG1 and the output unit 500 includes second and third planetary gear sets PG2 and PG3.

The first planetary gear set PG1 is a double pinion planetary gear set, and has a first sun gear S1, a first planet carrier PC1, and a first ring gear R1 as operational members thereof. In addition, the first sun gear S1 is operated as the first operating member, the first planet carrier PC1 is operated as the second operating member, and the first ring gear R1 is operated as the third operating member.

The second planetary gear set PG2 is a single pinion planetary gear set, and has a second sun gear S2, a second planet carrier PC2, and a second ring gear R2 as operational members thereof.

The third planetary gear set PG3 is a single pinion planetary gear set, and has a third sun gear S3, a third planet carrier PC3, and a third ring gear R3 as operational members thereof.

The second planet carrier PC2 is fixedly connected to the third ring gear R3, and the second sun gear S2 is fixedly connected to the third sun gear S3.

In addition, at least one of the fixedly connected second sun gear S2 and the third sun gear S3 is operated as the fourth operating member, the second ring gear R2 is operated as the fifth operating member, the third planet carrier PC3 is operated as the sixth operating member, and at least one of the fixedly connected second planet carrier PC2 and the third ring gear R3 is operated as the seventh operating member.

In addition, the first, second, and fifth clutches C1, C2, and C5 are disposed between the first planetary gear set PG1 and the second planetary gear set PG2, and the third and fourth clutches C3 and C4 and the first brake B1 are disposed at an opposite side to the speed reduction unit 400 with reference to the output unit 500.

Operation, shifting processes, and formation of each speed of the power train according to the fourth exemplary embodiment of the present invention are similar to those of the power train according to the first embodiment of the present invention, and may be easily obtained by a person skilled in the art based on the teachings herein. Thus, a detailed explanation thereof will be omitted.

Figure 10:
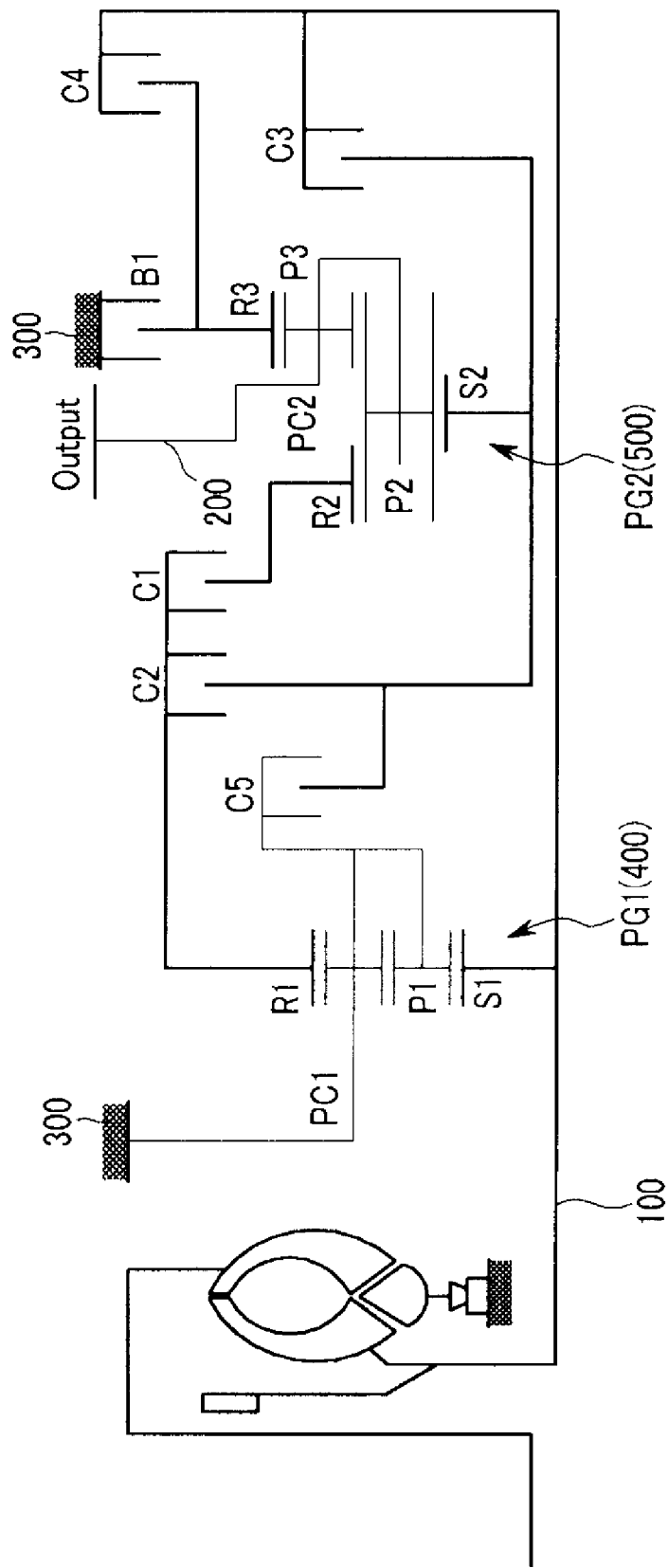
FIG. 10 is a schematic diagram of a power train of an automatic transmission according to the fifth exemplary embodiment of the present invention.
Figure 11:
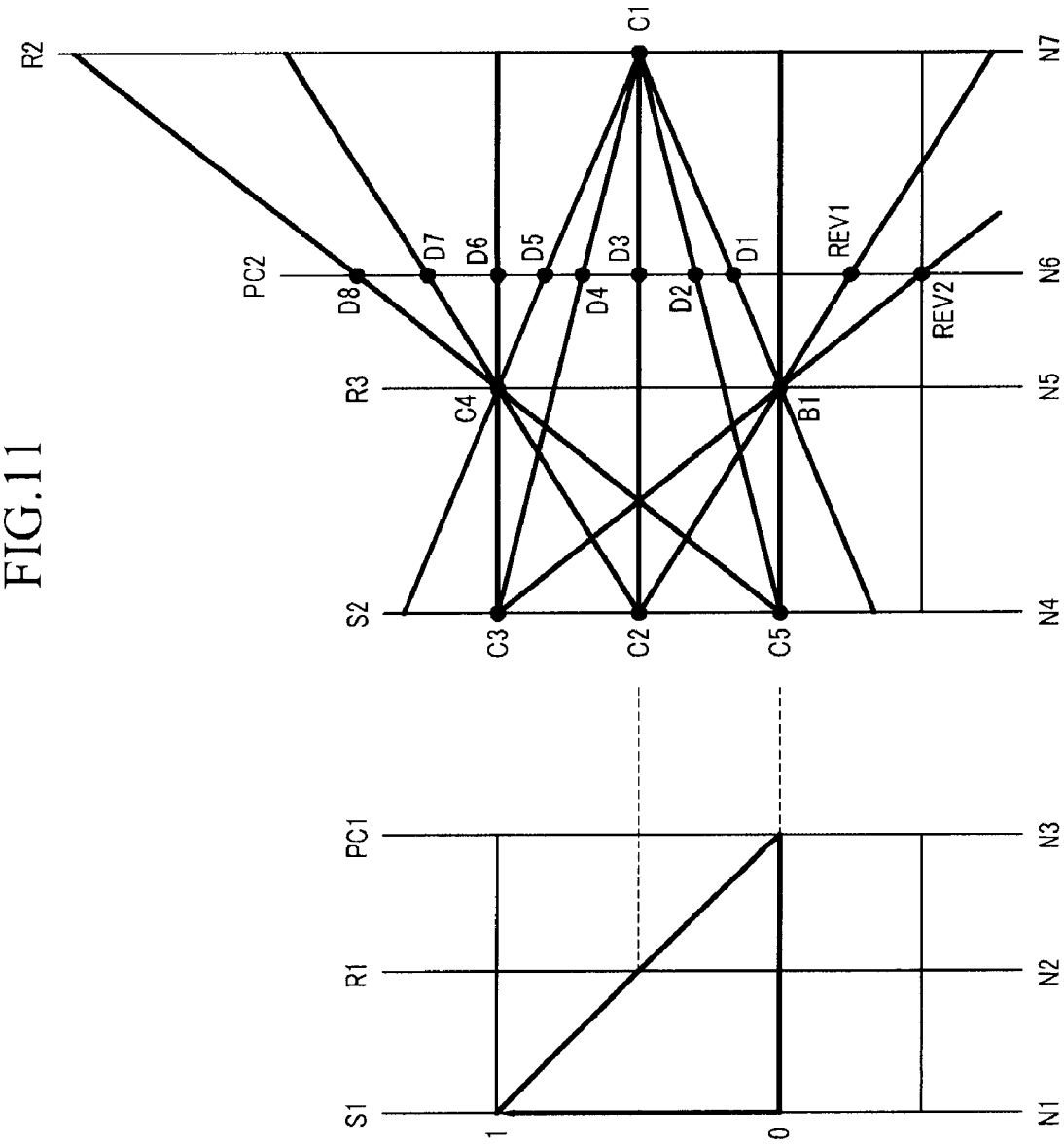
FIG. 11 is a lever diagram showing shifting processes from a first forward speed to an eighth forward speed and two reverse speeds in a power train of an automatic transmission according to the fifth exemplary embodiment of the present invention.

As shown in FIG. 10, according to the fifth exemplary embodiment of the present invention, the speed reduction unit 400 includes a first planetary gear set PG1 and the output unit 500 includes a second planetary gear set PG2.

The first planetary gear set PG1 is a double pinion planetary gear set, and has a first sun gear S1, a first planet carrier PC1, and a first ring gear R1 as operational members thereof. In addition, the first sun gear S1 is operated as the first operating member, the first planet carrier PC1 is operated as the second operating member, and the first ring gear R1 is operated as the third operating member.

The second planetary gear set PG2 is a Ravigneaux planetary gear set, and has a second sun gear S2, a second planet carrier PC2, a second ring gear R2, and a third ring gear R3 as operational members thereof. The second planetary gear set PG2 is the Ravigneaux planetary gear set where a single pinion planetary gear set having the second sun gear S2, the second planet carrier PC2, and the second ring gear R2 and a double pinion planetary gear set having the second sun gear S2, the second planet carrier PC2, and the third ring gear R3 have the second planet carrier PC2 and the second sun gear S2 in common. In addition, the second sun gear S2 is operated as the fourth operating member, the second ring gear R2 is operated as the fifth operating member, the third ring gear R3 is operated as the sixth operating member, and the second planet carrier PC2 is operated as the seventh operating member.

In addition, the first, second, and fifth clutches C1, C2, and C5 are disposed between the first planetary gear set PG1 and the second planetary gear set PG2, and the third and fourth clutches C3 and C4 are disposed on an opposite side to the first planetary gear set PG1 with reference to the second planetary gear set PG2.

Operation, shifting processes, and formation of each speed of the power train according to the fifth exemplary embodiment of the present invention are similar to those of the power train according to the first embodiment of the present invention, and may be easily obtained by a person skilled in the art based on the teachings herein. Thus, a detailed explanation thereof will be omitted.

According to the exemplary embodiments of the present invention, eight forward speeds and two reverse speeds may be realized by using two or three planetary gear sets, five clutches, and one brake.

In addition, since many shift speeds are realized, torque of an engine may be effectively used, power delivery performance may be improved, and fuel consumption may be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power train of an automatic transmission, comprising:
   an input shaft;
   an output gear;
   a transmission case;
   a speed reduction unit comprising a first operating member receiving torque from the input shaft, a second operating member fixed to the transmission case, and a third operating member generating a reduced rotational speed by operations of the first and second operating members;
   an output unit comprising a fourth operating member selectively connected to the second operating member and stopped or selectively connected to the input shaft or selectively connected to the third operating member and receiving the reduced rotational speed, a fifth operating member selectively connected to the third operating member and receiving the reduced rotational speed, a sixth operating member selectively connected to the input shaft or selectively connected to the transmission case and stopped, and a seventh operating member transmitting eight forward speeds and two reverse speeds to the output gear by operations of the fourth, fifth, and sixth operating members; and
   a plurality of friction members selectively connecting operating members of the speed reduction unit and the output unit to the input shaft, other operating members, or the transmission case,
   wherein the plurality of friction members comprises:
   a first clutch selectively connecting the third operating member to the fifth operating member;
   a second clutch selectively connecting the third operating member to the fourth operating member;
   a third clutch selectively connecting the fourth operating member to the input shaft;
   a fourth clutch selectively connecting the sixth operating member to the input shaft;
   a fifth clutch selectively connecting the second operating member to the fourth operating member; and
   a first brake selectively connecting the sixth operating member to the transmission case,
   wherein the speed reduction unit is a first planetary gear set having a first sun gear, a first ring gear, and a first planet carrier as operational members thereof,
   wherein the first planetary gear set is a double pinion planetary gear set, wherein the first sun gear is operated as the first operating member, the first planet carrier is operated as the second operating member, and the first ring gear is operated as the third operating member,
   wherein the output unit is a second planetary gear set having a second sun gear, a third sun gear, a second planet carrier, and a second ring gear as operational members thereof, wherein the second planetary gear set is a compound planetary gear set where a double pinion planetary gear set having the second sun gear, the second planet carrier, and the second ring gear and a single pinion planetary gear set having the third sun gear, the second planet carrier, the second ring gear have the second planet carrier and the second ring gear in common with the double pinion planetary gear set.

2. The power train of claim 1, wherein the third sun gear is operated as the fourth operating member, the second sun gear is operated as the fifth operating member, the second planet carrier is operated as the sixth operating member, and the second ring gear is operated as the seventh operating member.

3. The power train of claim 2, wherein the first, second, and fifth clutches and the first brake are disposed between the first planetary gear set and the second planetary gear set.

4. The power train of claim 2, wherein the third and fourth clutches are disposed on an opposite side to the first planetary gear set with reference to the second planetary gear set.

* * * * *